BIVALENT PULSE TRANSMITTER WITH OUTPUT SPECTRUM HAVING PRESCRIBED TRANSFER FUNCTION

Filed April 5, 1968

INVENTOR.
PETRUS J. VAN GERWEN
BY
Frank R. Trifari
AGENT

United States Patent Office 3,548,313

Patented Dec. 15, 1970

3,548,313

BIVALENT PULSE TRANSMITTER WITH OUTPUT SPECTRUM HAVING PRESCRIBED TRANSFER FUNCTION

Petrus Josephus van Gerwen, Emmasingel, Eindhoven, Netherlands, assignor, by mesne assignments, to U.S. Philips Corporation, New York, N.Y., a corporation of Delaware Filed Apr. 5, 1968, Ser. No. 719,155

Claims priority, application Netherlands, Apr. 8, 1967, 6705022

Int. Cl. H04l *1/10*

U.S. Cl. 325—141 6 Claims

ABSTRACT OF THE DISCLOSURE

A pulse transmission system in which bivalent pulses synchronized with clock pulses are coded by a shift register in order to minimize occurrence of periods of long duration of the same output. The elements of the shift register are applied to the output by way of separate attenuators in order that the output have a desired transfer function.

The invention relates to a transmitter arrangement for the transmission of bivalent pulse signals which includes a pulse source of bivalent pulses, the instants of occurrence of which coincide with a sequence of equidistant clock pulses, and further a coding device provided with a feedback shift register, which comprises a number of shift register elements, the content of which is shifted under the control of a clock pulse generator, a modulo-2-adder connected to the input of the shift register to which modulo-2-adder is connected on the one hand the pulse source and on the other hand the feedback circuit of the shift register, said feedback circuit also including a modulo-2-adder to which are applied pulses delayed by an integral number of clock periods and derived from different shift register elements for obtaining a feedback signal for the shift register.

Such a transmitter arrangement has been suggested in U. S. Pat. No. 3,421,146. In this known transmitter arrangement, the pulse signals derived from the coding device are applied for further transmission to a transmission path. The original pulse signals are recovered at the receiver end of the transmission path by means of a decoding device the operation of which is inverse to that of the coding device at the transmitter end. As has been set out in the said patent, this transmitter arrangement has the great practical advantage that at the receiver end the clock pulses for synchronizing purposes can be derived with sufficient reliability from the transistions between each two successive pulses of different values in the pulse signals received, since due to the said coding process, the probability that the transmitted pulse signals will include periods of long duration in which pulses of the same value uninterruptedly occur, is considerably reduced.

The invention has for an object to considerably simplify a transmitter arrangement of the kind mentioned in the preamble, which is used with the receiver of said patent, while using the elements already available.

The transmitter arrangement in accordance with the invention is characterized in that a prescribed transfer function of the transmitter arrangement is obtained by connecting the shift register elements through attenuation networks to a combination device, while the output signal of the transmitter arrangement is derived from the ouput of the combination device.

By the use of the steps according to the invention, the coding function may be obtained simultaneously with a prescribed transfer function in the transmitter arrangement, for example, of an output filter and/or of an equalizing network, by means of the attenuation networks and the combination device, which may be formed by resistors, as a result of which complicated output filters and possibly pre-equalizing networks for the transmission path are economized in the transmitter arrangement.

The invention and its advantages will now be described with reference to the figures.

Figure 1:
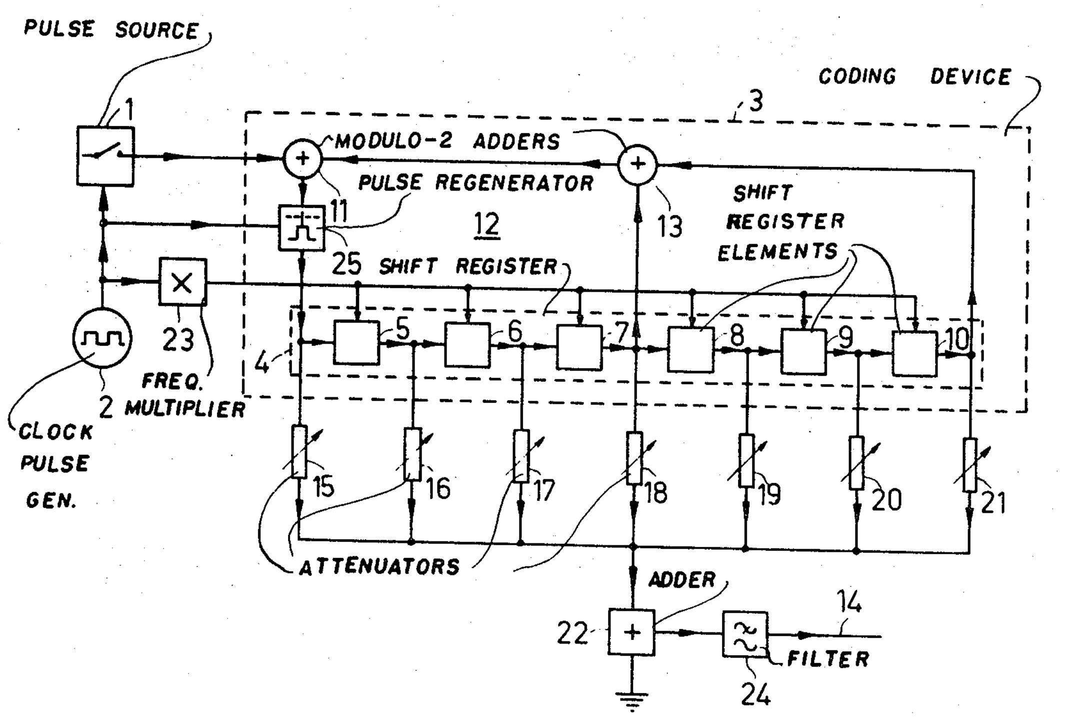
Figure 2:
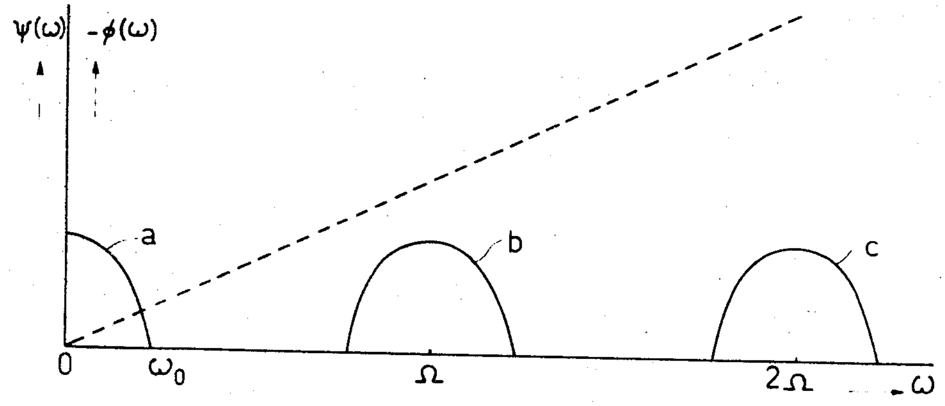

FIG. 1 shows a transmitter arrangement according to the invention, and FIG. 2 shows a transfer function for explanation of operation of the transmitter arrangement of FIG. 1.

The transmitter arrangement shown in FIG. 1 is designed for the direct transmission in a prescribed frequency band of 0 to 2 kc./s. of bivalent pulses which originate from a pulse source 1 and the instants of occurrence of which coincide with a sequence of equidistant clock pulses having a clock frequency of 2 kc./s. which corresponds to a clock period $T=0.5$ msec. The clock pulses originate, for example, from a clock pulse generator 2.

In order to ensure that the synchronization of a receiver arrangement co-operating with the transmitter arrangement can be effected by the transmitted bivalent pulse signals themselves, in which event the clock pulses are derived at the receiver end from the transitions between each two successive pulses of different values in the received pulse signals, the sequence of bivalent pulses originating from the pulse source 1 is applied to a coding device 3 and is converted therein into a new sequence of biovalent pulses.

The coding device 3 includes a shift register 4 which is provided with feedback and comprises a number of shift register elements 5, 6, 7, 8, 9, 10, the content of which is shifted under the control of the clock pulse generator 2. To the input of the shift register 4 is connected a modulo-2-added 11 to which is connected on the one hand the pulse source 1 and on the other hand a feedback circuit 12 of the shift register 4. The feedback circuit 12 also includes a modulo-2-adder 13 to which are applied pulses delayed by an integral number of clock periods and derived from different shift register elements 7 and 10 for obtaining a feedback signal for the shift register 4. The shift register 4 comprises, for example, a number of bistable trigger circuits.

By the use of the coding device 3, the probability that the coded sequence of bivalent pulses will include periods of long duration, in which pulses of solely one of the two values uninterruptedly occur, is considerably reduced, as has been described extensively in said Patent. For, due to the feedback through the feedback circuit 12, the coding device 3 is able to generate in periods, in which the pulse source continuously supplies pulses of the same value, a sequence of bivalent pulses in which pulses of both values are distributed pseudo-randomly, whilst outside these periods the coding device 3 converts the pulse sequence originating from the pulse source 1 into a new pulse sequence which also includes pulses of both values. Thus, the coded pulse sequence continuously includes a sufficient number of transitions between pulses of different values to guarantee the synchronization of the receiver arrangement.

The coded pulse sequence derived from the coding device 3 is now applied to a transmission path 14 for further transmission to a receiver arrangement co-operating with the transmitter arrangement.

Although the synchronization of the receiver arrangement is already sufficiently guaranteed by this step, under certain conditions which are not likely to occur, the coded pulse sequence may nevertheless include periods of long duration in which pulses of the same value uninterruptedly occur. In the manner described in the said patent, this undesirable phenomenon can be avoided by the use of a time-measuring device which ensures that a pre-determined time interval after the occurence of the first pulse of a coded sequence of pulses of equal value a pulse of the other value is transmitted. However, this step is not essential to the present invention and will therefore not be described more fully.

According to the invention, the shift register 4 used for the coding process and provided with feedback is utilized at the same time for obtaining a prescribed transfer function by connecting the shift register elements 5, 6, 7, 8, 9, 10 through adjustable attenuation networks 15, 16, 17, 18, 19, 20, 21 to a combination device 22, while the output signal of the transmitter arrangement is derived from the output of the combination device 22. In the embodiment shown, the clock pulse generator 2 is connected through a frequency multiplier 23 to the shift register 4 so that the content of the shift register 4 is shifted with a shift period which is shorter than the clock period T. In the embodiment of FIG. 1, for example, the multiplication factor of the frequency multiplier is 3 so that the shift period $\tau$ is equal to $T/3$.

When with a given shifting period $\tau$ the transfer coefficients of the attenuation networks 15, 16, 17, 18, 19, 20, 21 are suitably proportioned, a desired transfer function, for example, a given filter or equalization characteristic, is obtained by means of the feedback shift register 4.

If, for example, a filter characteristic should be obtained having an arbitrary amplitude-frequency characteristic and a linear phase-frequency characteristic, the attenuation networks are made equal in pairs, starting from the ends of the shift register 4, that is to say that in the embodiment shown, the transfer coefficients of the attenuation networks 15, 21 are both $C_3$, those of the attenuation networks 16, 20 both $C_2$ and those of the attenuation networks 17, 19 both $C_1$, while the transfer coefficient of the attenuation network 18 is $C_0$. It will be shown mathematically that an arbitrary amplitude-frequency characteristic can thus be obtained together with a linear phase-frequency characteristic.

The mathematical treatment of the arrangement of FIG. 1 starts from an arbitrary component of the angular frequency $\omega$ and of the amplitude A in the frequency spectrum of the coded pulse sequence applied to the input of the shift register 4, which component can be written in complex form as:

$$Ae^{j\omega T} \quad (1)$$

In the successive shift register elements 5, 6, 7, 8, 9, 10, the relevant spectrum component is shifted over time intervals $\tau$, $2\tau$, $3\tau$, $4\tau$, $5\tau$, $6\tau$, which spectrum component shifted over these time intervals can be written as:

$$Ae^{j\omega(t-\tau)},\ Ae^{j\omega(t-2\tau)},\ Ae^{j\omega(t-3\tau)},\ Ae^{j\omega(t-4\tau)}\ Ae^{j\omega(t-5\tau)},\ Ae^{j\omega(t-6\tau)}$$

This spectrum component is applied to the combination device 22 through the relevant attenuation networks 15, 16, 17, 18, 19, 20, 21, the transfer coefficients of which have been made equal in pairs and are $C_3$, $C_2$, $C_1$, $C_0$, $C_1$, $C_2$ and $C_3$, respectively, which results in an output signal:

$$C_3Ae^{j\omega t}+C_2Ae^{j\omega(t-\tau)}+C_1Ae^{j\omega(t-2\tau)}+C_0Ae^{j\omega(t-3\tau)} +C_1Ae^{j\omega(t-4\tau)}+C_2Ae^{j\omega(t-5\tau)}+C_3Ae^{j\omega(t-6\tau)} \quad (2)$$

An arbitrary component $Ae^{j\omega T}$ in the frequency spectrum of the coded pulse sequence applied to the shift register 4 supplies an output signal in accordance with Formula 2 so that it holds for the transfer function $H(\omega)$ of the arrangement comprising the shift register, the attenuation networks and the combination device that:

$$H(\omega)=C_3+C_2e^{-j\omega\tau}+C_1e^{-2j\omega\tau}+C_0e^{-3j\omega\tau}+C_1e^{-4j\omega\tau} +C_2e^{-5\omega\tau}+C_3e^{-6j\omega\tau} \quad (3)$$

The combination of terms having equal transfer coefficients results in:

$$H(\omega)=C_3(e^{3j\omega\tau}+e^{-3j\omega\tau})e^{-3j\omega\tau}+C_2(e^{2\omega j\tau} +e^{-2j\omega\tau})e^{-3j\omega\tau}+C_1(e^{j\omega\tau}+e^{-j\omega\tau})e^{-3j\omega\tau}+C_0e^{-3j\omega\tau}$$

and thus it holds that:

$$H(\omega)=(C_0+2C_1\cos\omega\tau+2C_2\cos 2\omega\tau +2C_3\cos 3\omega\tau)e^{-3j\omega\tau} \quad (4)$$

The amplitude-frequency characteristic $\psi(\omega)$ is then given by:

$$\psi(\omega)=C_0+2C_1\cos\omega\tau+2C_2\cos 2\omega\tau+2C_3\cos 3\omega\tau \quad (5)$$

and the phase-frequency characteristic $\phi(\omega)$ by:

$$\phi(\omega)=-3\omega\tau \quad (6)$$

It is thus found that the phase varies exactly linearly with the frequency of the components in the spectrum of the coded pulse signals applied to the shift register 4. Upon variation of the transfer coefficient $C_0$, $C_1$, $C_2$, $C_3$, the shape of the amplitude-frequency characteristic $\psi(\omega)$ also varies, but the linearity of the phase-frequency characteristics $\phi(\omega)$ is not influenced. By the use of the steps according to the invention, an arbitrary amplitude-frequency characteristic can be obtained while retaining a linear phase-frequency characteristic when the transfer coefficients of the attenuation networks are suitably chosen, which implies that in the transmitter arrangement of FIG. 1, the coded pulse signals can be filtered in any desired manner without any phase distortion being introduced.

The above considerations may apply without further steps to a shift register 4 having an arbitrary number of shift register elements, while for a better survey of the coding process in the coding device 3, the feedback signal for the shift register 4 is invariably obtained by applying the pulses delayed solely by an integral number of clock periods and derived from different shift register elements to the modulo-2-adder 13 in the feedback circuit 12. When the number of shift register elements is enlarged to 2N, the amplitude-frequency characteristic $\psi(\omega)$ has the form:

$$\psi(\omega)=C_o+\sum_{1}^{N}2C_k\cos k\omega\tau \quad (7)$$

and the phase-frequency characteristic $\phi(\omega)$ has an exactly linear variation in accordance with $$\phi(\omega)=-N\omega\tau \quad (8)$$

As appears from Formula 7, the amplitude-frequency characteristic $\psi(\omega)$ forms a Fourier series which is developed in terms $C_k\cos k\omega\tau$ and the periodicity $\Omega$ of which is given by:

$$\Omega\tau=2\pi \quad (9)$$

If a given amplitude-frequency characteristic $\psi(\omega)$ should be obtained, the coefficients $C_k$ in the Fourier development can be calculated in a simple manner, since it holds that:

$$C_k=\frac{1}{\Omega}\int_0^{\Omega}\psi(\omega)\cos k\omega\tau d\omega \quad (10)$$

When these coefficients $C_k$ are known, the form of the amplitude-frequency characteristic is accurately defined. The periodic behaviour of the Fourier development results, however, in that the desired amplitude-frequency characteristic recurs with the periodicity $\Omega$. This is illustrated in greater detail in FIG. 2, in which the variation both of the amplitude-frequency characteristic $\psi(\omega)$ and of the phase-frequency characteristic $\phi(\omega)$ is shown for a given low-pass filter having a cut-off frequency $\omega_0$. The desired pass region indicated by the curve *a* recurs each time after a frequency interval equal to the periodicity $\Omega$, as a result of which the additional pass regions indicated by the curves *b* and *c* are obtained.

In practice, these additional pass regions are not disturbing, since at a sufficiently high value of the periodicity $\Omega$, which according to Formula 9 implies: at a sufficiently low value of the shift period $\tau$, the frequency interval between the desired pass region and the additional pass regions is sufficiently large, as a result of which these additional pass regions can be suppressed by an extremely simple suppression filter 24 at the output of the combination device 22 without the amplitude-frequency characteristic and the linear phase-frequency characteristic in the desired pass region being influenced. The suppression filter 24 of FIG. 1 is constituted, for example, by a lowpass filter comprising a resistor and a capacitor.

The field of uses is considerably enlarged if inverted pulse signals are derived from a few shift register elements by means of invertor stages or of the shift register elements themselves, since when the shift register elements are constructed as bistable trigger circuits, besides the pulse signals the inverted pulse signals will also appear at the bistable trigger circuits. Thus, negative coefficients $C_k$ according to Formula 10 can be obtained in the Fourier development.

Furthermore, the use of this step permits of obtaining an amplitude-frequency characterisitc $\psi(\omega)$ developed in sine terms with a linear phase-frequency characteristic $\phi(\omega)$. For if also in this case, the attenuation networks are made equal in pairs starting from the ends of the shift register 4 and if further the transfer coefficient $C_0$ of the attenuation network is chosen to be zero, but if, in contradistinction to the case described above, the inverted pulse signal is applied to the attenuation networks 19, 20, 21, the transmission function $H(\omega)$ can be written as:

$$H(\omega)=C_3(e^{3j\omega\tau}-e^{-3j\omega\tau})e^{-3\omega\tau}+C_2(e^{2j\omega\tau}-e^{-2j\omega\tau})e^{-3j\omega\tau}+C_1(e^{j\omega\tau}-e^{-j\omega\tau})e^{3j\omega\tau}$$

or as:

$$H(\omega)=(2C_1 \sin \omega\tau+2C_2 \sin 2\omega\tau+2C_3 \sin 3\omega\tau)je^{-3j\omega\tau} \quad (11)$$

The amplitude-frequency characteristic $\psi(\omega)$ is now given by:

$$\psi(\omega)=2C_1 \sin \omega\tau+2C_2 \sin 2\omega\tau+2C_3 \sin 3\omega\tau \quad (12)$$

and the phase-frequency characteristic $\phi(\omega)$ by:

$$\theta(\omega)=-3\omega\tau+\frac{\pi}{2} \quad (18)$$

The linear phase-frequency characteristic according to Formula 13 is shifted in phase with respect to that according to Formula 6 by $\pi/2$. Again, the above considerations may apply to an arbitrary number 2N of shift register elements and it then holds that:

$$\psi(\omega)=\sum_{1}^{N} 2C_k \sin k\omega\tau$$

$$\theta(\omega)=N\omega\tau+\frac{\pi}{2}$$

$$C_k=\frac{1}{\Omega}\int_0^{\Omega}\psi(\omega) \sin k\omega\tau d\omega \quad (14)$$

Thus, with a suitable choice of the transfer coefficients of the attenuation networks, any arbitrary amplitude-frequency characteristic can be obtained with a linear phase-frequency characteristic.

By the use of the arrangement according to the invention, not only an arbitrary amplitude-frequency characteristic can be obtained, but also the filtering operation described as well as a phase equalization can be effected in the pass region prescribed for the transmission of the pulse signals. For example, in order to compensate a phase error occurring in the transmission through the transmission path, a pre-equalization can then be obtained in this transmitter arrangement by producing a deviation from the linear variation of the phase-frequency characteristic compensating for this phase error by means of a suitable proportioning of the transfer coefficients of the attenuation networks. If solely a phase equalization should be obtained without influencing the amplitude-frequency characteristic, it can be shown mathematically that, when the phase-frequency characteristic $\phi(\omega)$ of a physically obtainable network prescribed in the frequency interval $0<\omega<\Omega/2$ is achieved by means of a shift registor 4 having 2N shift register elements, the transfer coefficients $C_n$ of the attenuation networks can be defined in accordance with the formula:

$$C_n=\frac{2}{\Omega}\int_0^{\Omega/2} \cos [\phi(\omega)+N\omega\tau+n\omega\tau]d\omega \quad (15)$$

where $n$ assumes in order of succession the value $-N$, $-(N-1)$, . . . , $-2$, $-1$, 0, 1, 2, . . . , $N-1$, $N$ whilst $\Omega$ again corresponds to the relation $\Omega\tau=2\pi$. In this case, the frequency multiplier 23 connected to the clock pulse generator 2 may be omitted.

Extensive practical experiments have shown that under certain conditions, the shift register 4 provided with feedback may tend to self-oscillate in an undesired manner at a frequency exceeding the clock frequency. In order to suppress such a tendency, the transmitter arrangement of FIG. 1 includes between the modulo-2-adder device 11 and the input of the shift register 4 a pulse regenerator 25 which is controlled by the clock pulse generator and which ensures that the feedback signal at the input of the shift register 4 includes solely pulses of a duration equal to the clock period T. This pulse regenerator 25 may be connected between the modulo-2-adders 13 and 11 in the feedback circuit 12 instead of between the modulo-2-adder 11 and the input of the shift register 4, since also in this case, the feedback signal for the shift register 4 is solely constituted by pulses of a duration T.

By the use of the steps according to the invention, the shift register, which is provided with feedback and is used for recovering the clock pulses at the receiver end in a reliable manner, is utilized at the same time for obtaining in a simple manner a prescribed transfer function, for example, a filter and/or an equalization characteristic. Both functions, viz. the coding process and the realisation of the transfer function, can be combined without any disturbing mutual influence so that the field of practical uses of the transmitter arrangement for the transmission of bivalent pulse signals is considerably enlarged, since inter alia complicated filters and equalizing networks can be economized.

Moreover, the use of the steps according to the invention affords the additional advantage that the transmitter arrangement has a construction which is particularly suitable for use as an "integrated circuit," since all the elements, i.e. shift register elements, attenuation networks, combination device and modulo-2-adders, can be constructed in a simple manner as integrated circuits. If desired, the attenuation networks may be constructed as a separate integrated unit, which results in a further increase in flexibility, since a simple exchange of such a unit provides a rapid adaptation to the relevant use.

What is claimed is:

1. A pulse transmission system comprising a source of clock pulses, a source of bivalent pulses synchronized with said clock pulses, a shift register having a plurality of shift register elements, means for combining the outputs of said shift register elements, means responsive to said clock pulses for continuously shifting signals stored in said shift register, first modulo-2-adder means having first and second inputs connected to the outputs of different shift register elements, a second modulo-2-adder means, means applying said bivalent pulses and the output of said first adder means to said second adder means, means applying the output of said second adder means to said shift register and to said shift register combining means, output circuit means connected to said combining means, and means for converting the binary signals stored in said shift register into a filtered binary signal comprising separate weighting means connecting said shift register elements to said combining means, at least one of said weighting means having a value different from at least one other weighting means.

2. A transmitter arrangement as claimed in claim 1, characterized in that the feedback circuit is connected nected through a frequency multiplier to the shift register elements.

3. A transmitter arrangement as claimed in claim 2, characterized in that the feedback circuit is connected through a pulse regenerator controlled by the clock pulse generator to the input of the shift register, which pulse regenerator supplies to the shift register solely pulses of a duration equal to the clock period.

4. A transmitter arrangement as claimed in claim 1, characterized in that inverted pulse signals are derived nected to it a suppression filter which suppresses additional pass regions.

5. A transmitter arrangement as claimed in claim 1, characterized in that the combination device is constituted by a resistor, while the shift register elements are connected through said weighting means comprising attenuation resistors to the combination device constituted by a resistor.

6. A transmitter arrangement as claimed in claim 1, characterized in that inverted pulse signals are derived from the shift register elements by coupling said weighting means to the inverted output thereof.

References Cited

UNITED STATES PATENTS

| | | | |
|---|---|---|---|
| 3,155,818 | 11/1964 | Goetz | 340—146.1X |
| 3,337,863 | 8/1967 | Lender | 340—347 |
| 3,388,330 | 6/1968 | Kretzmer | 325—42 |

ROBERT L. GRIFFIN, Primary Examiner

B. V. SAFOUREK, Assistant Examiner

U.S. Cl. X.R.

178—68; 325—41; 340—167